US011300418B2

(12) United States Patent
Liu et al.

(10) Patent No.: US 11,300,418 B2
(45) Date of Patent: Apr. 12, 2022

(54) CUSTOMIZED TRIP GROUPING BASED ON INDIVIDUALIZED USER PREFERENCES

(71) Applicant: International Business Machines Corporation, Armonk, NY (US)

(72) Inventors: Su Liu, Austin, TX (US); Kai Liu, Malden, MA (US); Zhichao Li, Austin, TX (US); Manjunath Ravi, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 442 days.

(21) Appl. No.: 16/416,484

(22) Filed: May 20, 2019

(65) Prior Publication Data
US 2020/0370896 A1  Nov. 26, 2020

(51) Int. Cl.
| | | |
|---|---|---|
| *G01C 21/00* | (2006.01) | |
| *G01C 21/34* | (2006.01) | |
| *G06Q 50/14* | (2012.01) | |
| *G06Q 50/00* | (2012.01) | |
| *G06Q 10/04* | (2012.01) | |

(52) U.S. Cl.
CPC ....... *G01C 21/343* (2013.01); *G01C 21/3492* (2013.01); *G06Q 10/047* (2013.01); *G06Q 50/01* (2013.01); *G06Q 50/14* (2013.01)

(58) Field of Classification Search
CPC .............. G01C 21/343; G01C 21/3492; G06Q 10/047; G06Q 50/01; G06Q 50/14
See application file for complete search history.

(56) References Cited

U.S. PATENT DOCUMENTS

| | | | |
|---|---|---|---|
| 5,948,040 A | 9/1999 | Delorme et al. | |
| 5,982,298 A | 11/1999 | Lappenbusch et al. | |
| 7,925,540 B1 | 4/2011 | Orttung et al. | |
| 9,009,167 B2 | 4/2015 | Cerny | |
| 9,384,661 B1 | 7/2016 | Deluca et al. | |
| 2005/0033616 A1 | 2/2005 | Vavul et al. | |
| 2011/0161319 A1* | 6/2011 | Chunilal ............ | G06Q 30/0243 707/733 |

(Continued)

FOREIGN PATENT DOCUMENTS

EP        3109593 A2    12/2016

OTHER PUBLICATIONS

Anagnostopoulos et al.; "Tour Recommendation for Groups"; ISTI CNR, Pisa, Italy; 2015; 30 pages.

(Continued)

*Primary Examiner* — Adam M Alharbi
(74) *Attorney, Agent, or Firm* — Cantor Colburn LLP; Edward Wixted

(57) ABSTRACT

Provided are systems, methods, and media for building a prioritized group trip object to generate a social trip plan recommendation. An example method includes receiving a static trip grouping scheme object for a group of users. Generating an interactive customized scheme object (ICSO) for each user based, at least in part, on the received static trip grouping scheme object and on a set of user preferences of the user such that a plurality of ICSOs are generated for the group of users. Merging the plurality of ICSOs to generate a prioritized group trip ICSO. Generating a recommended trip plan for the group based, at least in part, on the prioritized group trip ICSO.

17 Claims, 6 Drawing Sheets

(56) References Cited

U.S. PATENT DOCUMENTS

| | | |
|---|---|---|
| 2014/0278071 A1 | 9/2014 | San Filippo et al. |
| 2014/0304014 A1 | 10/2014 | Lee et al. |
| 2015/0006209 A1 | 1/2015 | Busquiel et al. |
| 2015/0204685 A1 | 7/2015 | Gearhart et al. |
| 2015/0253144 A1 | 9/2015 | Rau et al. |
| 2017/0023370 A1 | 1/2017 | Delaney et al. |
| 2017/0046802 A1* | 2/2017 | Zhang ................. G06F 16/9537 |
| 2017/0048664 A1* | 2/2017 | Zhang .................... H04L 67/22 |

OTHER PUBLICATIONS

Anonymous; "Automatically Filtering Itinerary for Reuse and Collaboration"; ip.com; IPCOM000237264D; Jun. 10, 2014; 3 pages.
Anonymous; "Cognitive Travel Optimizer"; ip.com; IPCOM000248570D; Dec. 20, 2016; 2 pages.
Anonymous; "Domestic Travel Fact Sheet"; US Travel Association; Mar. 2019; 1 page.
Anonymous; "Generating Travel Itineraries Based on User Interests"; ip.com; IPCM000252013D; Dec. 13, 2017; 38 pages.
Lim; "Personalized Recommendation of Travel Itineraries based on Tourist Interests and Preferences"; Victoria Research Laboratory, National ICT Australia, Australia; 2017; 4 pages.
Mell et al.; "The NIST Definition of Cloud Computing—Recommendations of the National Institute of Standards and Technology"; U.S. Department of Commerce; Sep. 2011; 7 pages.
Rajasekar et al.; "An Efficient Construction of Itinerary Planning for Multi-Users"; International Journal for Trends in Engineering and Technology, vol. 3 Issue 1. Jan. 2015; pp. 90-93.

* cited by examiner

CUSTOMIZED TRIP GROUPING BASED ON INDIVIDUALIZED USER PREFERENCES

BACKGROUND

The present invention generally relates to trip planning, and more specifically, to customized trip grouping based on individualized user preferences.

Trip planning systems often seek to identify trip routes or travel itineraries based on the fastest possible route. Some systems identify those routes based on traffic and weather condition data.

SUMMARY

Embodiments of the present invention provide a computer-implemented method for building a prioritized group trip object to generate a social trip plan recommendation. A non-limiting example of the computer-implemented method includes receiving, by a system comprising one or more processors, a static trip grouping scheme object for a group of users, the group including two or more users. The method includes generating, by the system, an interactive customized scheme object (ICSO) for each user based, at least in part, on the received static trip grouping scheme object and on a set of user preferences of the user such that a plurality of ICSOs are generated for the group of users, in which at least one ICSO of the plurality of ICSOs includes at least one of an intermediate sightseeing list, a restaurants list, a hotels list, and/or a preferred scenery list. The method includes merging, by the system, the plurality of ICSOs to generate a prioritized group trip ICSO, in which the merging is based, at least in part, on a first set of prioritization rules and a second set of prioritization rules, in which the first set of prioritization rules includes merging based on a common trip route found in the plurality of ICSOs. The method includes generating, by the system, a recommended trip plan for the group based, at least in part, on the prioritized group trip ICSO.

Embodiments of the present invention provide a system for building a prioritized group trip object to generate a social trip plan recommendation. A non-limiting example of the system includes one or more processors configured to perform a method. A non-limiting example method includes receiving, by the system, a static trip grouping scheme object for a group of users, the group including two or more users. The method includes generating, by the system, an interactive customized scheme object (ICSO) for each user based, at least in part, on the received static trip grouping scheme object and on a set of user preferences of the user such that a plurality of ICSOs are generated for the group of users, in which at least one ICSO of the plurality of ICSOs includes at least one of an intermediate sightseeing list, a restaurants list, a hotels list, and/or a preferred scenery list. The method includes merging, by the system, the plurality of ICSOs to generate a prioritized group trip ICSO, in which the merging is based, at least in part, on a first set of prioritization rules and a second set of prioritization rules, in which the first set of prioritization rules includes merging based on a common trip route found in the plurality of ICSOs. The method includes generating, by the system, a recommended trip plan for the group based, at least in part, on the prioritized group trip ICSO.

Embodiments of the invention are directed to a computer program product for building a prioritized group trip object to generate a social trip plan recommendation, the computer program product comprising a computer readable storage medium having program instructions embodied therewith. The program instructions are executable by a system comprising one or more processors cause the system to perform a method. A non-limiting example method includes receiving, by the system, a static trip grouping scheme object for a group of users, the group including two or more users. The method includes generating, by the system, an interactive customized scheme object (ICSO) for each user based, at least in part, on the received static trip grouping scheme object and on a set of user preferences of the user, such that a plurality of ICSOs are generated for the group of users, in which at least one ICSO of the plurality of ICSOs includes at least one of an intermediate sightseeing list, a restaurants list, a hotels list, and/or a preferred scenery list. The method includes merging, by the system, the plurality of ICSOs to generate a prioritized group trip ICSO, in which the merging is based, at least in part, on a first set of prioritization rules and a second set of prioritization rules, in which the first set of prioritization rules includes merging based on a common trip route found in the plurality of ICSOs. The method includes generating, by the system, a recommended trip plan for the group based, at least in part, on the prioritized group trip ICSO.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
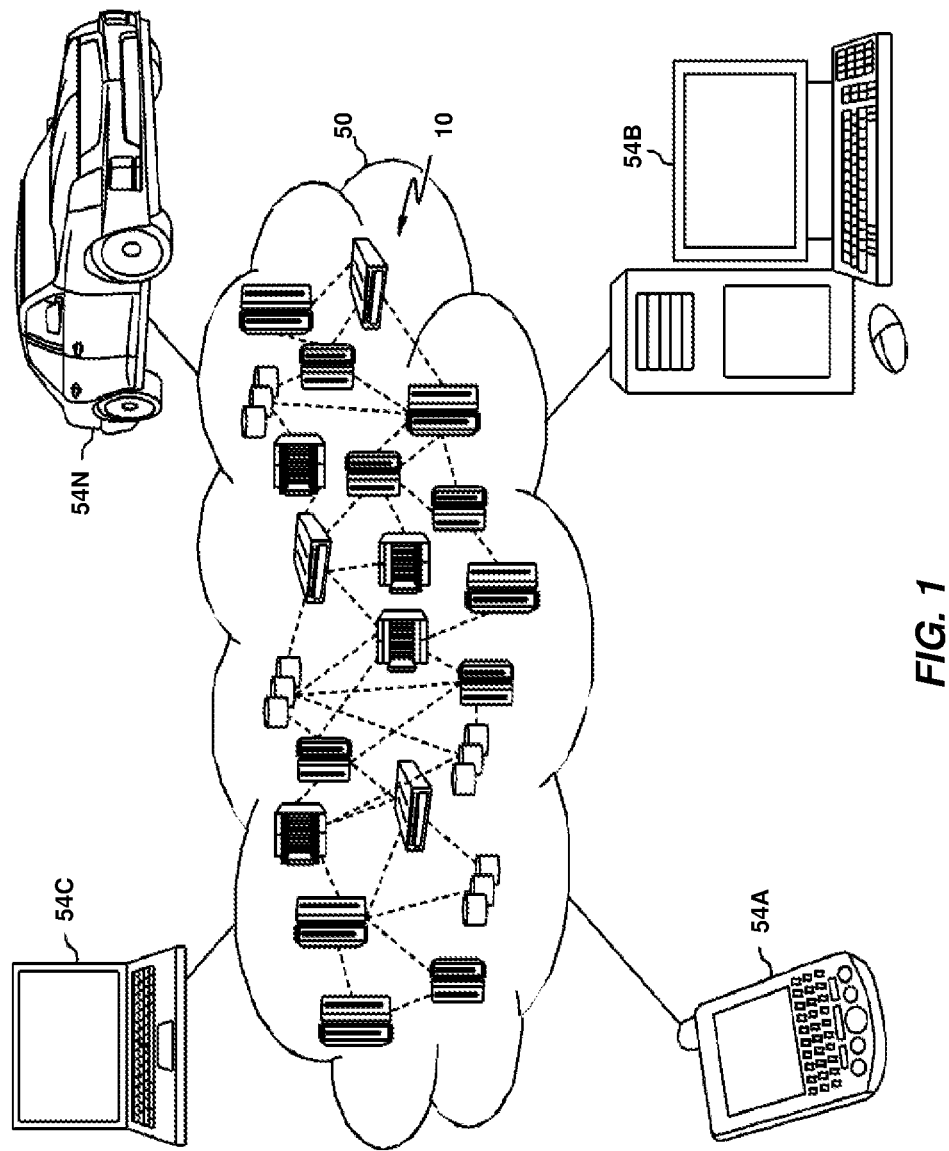
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
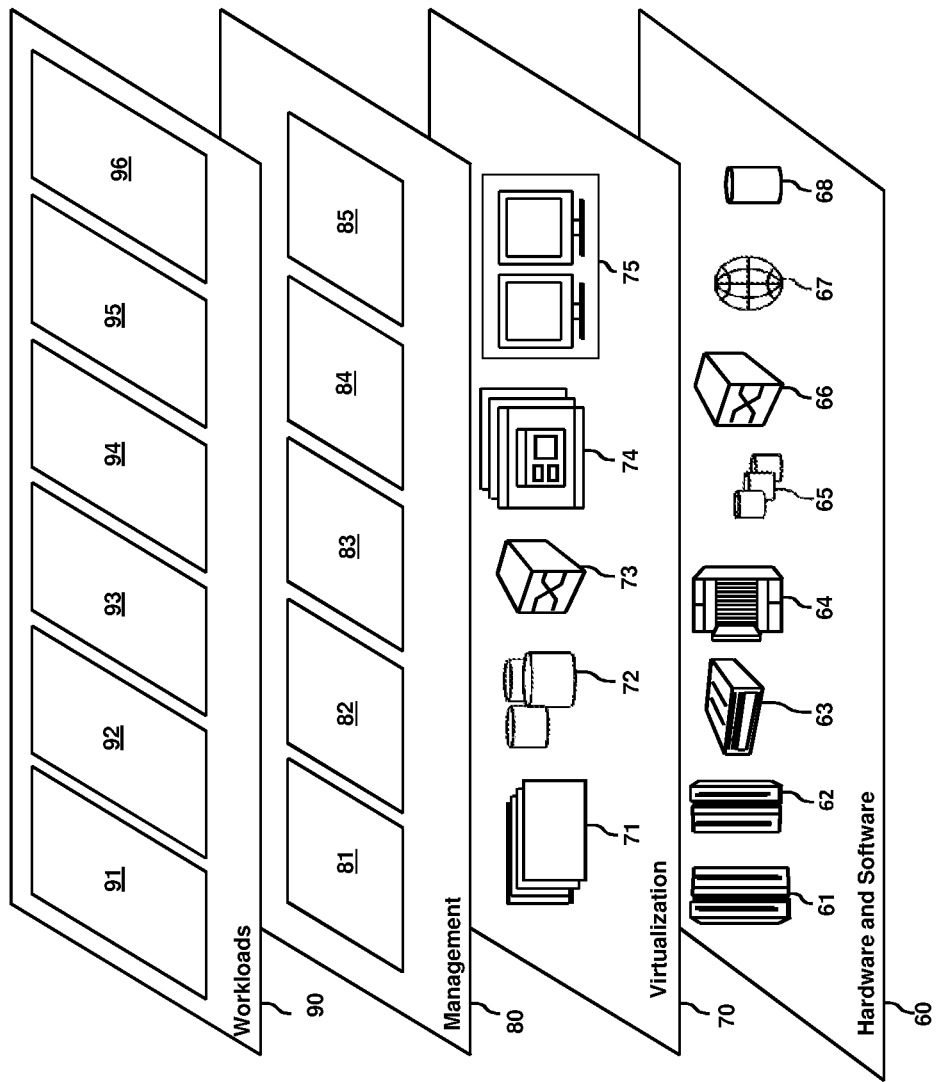
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and trip plan recommendation processing 96.

Turning now to an overview of technologies that are more specifically relevant to aspects of the invention, as noted above, some trip planning systems attempt to identify trip routes or travel itineraries based on traffic and weather condition data. However, those system have various technical problems. For example, given a selection between the following travel routes for a user: (a) heavy traffic in a freeway by the sea or (b) light traffic with the road in a town, some systems may select the light traffic route (a) merely because the route is the fastest route. However, such a selection that is merely based on efficiency ignores factors that may be of importance to the user. For example, a user who enjoys sea views and a leisurely atmosphere may prefer the freeway route over the light traffic road even if the freeway route takes longer to reach the destination.

Turning now to an overview of the aspects of the invention, one or more embodiments of the invention addresses the above-described shortcomings of the prior art by providing a highly customized trip grouping (HCTG) system that provides a customized trip group plan with interactive and automatic features that are based on various factors of each individuals of the group (e.g., group tip goal, age, education, personality, medical condition, emotion, etc.).

In some embodiments of the present invention, the system provides a static trip grouping input that includes attributes common to the member of a group. For example, in some embodiments of the present invention, the static trip grouping input includes an origin address (e.g., GPS coordinates), a destination address (e.g., GPS coordinates), a start date, and end date, and/or a list of people (e.g., members of the group). The following is an example data structure which may be used to store the static trip grouping input:

```
{
    Origin<latitude, longitude>,
    Destination<latitude, longitude>,
    Start Date(YYYY-MM-DD HH:MM:SS),
    End Date(YYYY-MM-DD HH:MM:SS),
    List of People ( )
}
```

In some embodiments of the present invention, the system is configured to recognize each individual in the group that is set forth in the static trip grouping input and to create a profile for each person. In some embodiments of the present invention, the system is configured to create the profile of the user based on exacting attributes of the user from a variety of sources (e.g., social media account).

In some embodiments of the present invention, the system is configured to generate an interactive customized scheme object (ICSO) data structure for each individual in a group, wherein the ICSO captures individual preferences of a particular user and outputs one or more trip routes based on the preferences. In some embodiments of the present invention, a graphical user interface provides the presents a set of trip plan options to a user, in which the user is able to select one or more of the trip plan options to indicate an interest of a particular option. The system is configured to track the choices of the individual and extract their preferences from each ICSO. The system is configured to merge the ICSO objects to identify a balance between the ICSOs. The system updates and generates a new ICSO when an individual makes a choice. In some embodiments of the present invention, the ICSO is updated based on instant weather and traffic conditions.

In some embodiments of the present invention, the ICSO structure of a particular user includes a scheme ID, a user ID, a location, a weather state, a traffic state, a list of intermediate sightseeing list, a restaurant list, a hotel list, preferred scenery list, a timestamp, and/or a version number. In some embodiments of the present invention, the location is a current location of the individual (e.g., GPS coordinates). In some embodiments of the present invention, the intermediate sightseeing list includes a list of location addresses (e.g., GPS coordinates) of one or more sightseeing destinations selected by the user. In some embodiments of the present invention, the restaurants list includes a list of location address (e.g., GPS coordinates) of one or more restaurants selected by the user. In some embodiments of the present invention, the restaurants list includes a hash mapped location and type. In some embodiments of the present invention, the hotels list includes a list of location address (e.g., GPS coordinates) of one or more hotels selected by the user. In some embodiments of the present invention, the hotels list includes a hash mapped location and cost. In some embodiments of the present invention, the preferred scenery list includes one or more sceneries selected by the user such as for example, a mountain selection, a lake selection, a river selection, a village section, a waterfall selection. In some embodiments of the present invention, the proffered scenery listing includes one or more values, in which each value uniquely references a particular scenery (e.g., 0—mountain, 1—lake, 2—river, 3—village, 4—waterfall, etc.).

The following is an example ICSO data structure that may be utilized in accordance with one or more embodiments of the present invention:

```
{
    Scheme-id,
    User-id,
    Location(<latitude, longitude>),
    Weather state,
    Traffic state,
    Intermediate Sightseeings(List<latitude, longitude>),
    Restaurants(Hash Map <location, type>),
    Hotels(Hash Map <location, cost>),
    Preferred scenery (0 - mountain, 1 - lake, 2 - river, 3 - village, 4
    - waterfall),
    Timestamp(YYYY-MM-DD HH:MM:SS), -- updating every 15
    mins
    Version(int)
}
```

In references to the generation of the ICSO, in some embodiments of the present invention, the ICSO is generated for each individual in the group prior to a trip. Each individual is able to populate attributes of their respective ICSO via a graphical user interface. For example, a user may select via the graphical user interfaces, desired intermediate sightseeing destinations, restaurants, hotels and/or preferred scenery. A customize ICSO is then generated based on the individual preferences selected by the user. As each individual may make different selections, each ICSO may be different for each member of the group.

In order to avoid conflicts when merging ICSO when generating a trip plan for the group, a set of merging rules may be executed prior to a trip being conducted. The following is an example set of rules that may be utilized when merging the ICSOs of the individuals. It should be understood that other suitable rules may be applied. For example, in some embodiments of the present invention, the set of rules includes first identifying routes that are in common across the ICSOs and retaining the common routes. Second, identifying uncommon object attributes from the ICSOs, such as for example, different preferences of restaurant, hotels, and/or scenery. In some embodiments of the present invention, the restaurants, hotels, and/or scenery are then pinned on a map according to their respective locations and their distance from the common route is calculated. A trip route is then generated based on the common route, in which the generated route traverses a subset of the pinned locations, in which the subset includes pinned locations that have a calculated distance within a predetermined threshold (e.g., a maximum distance from a desired location to the common route). In some embodiments of the present invention, this threshold is established via customization of an ICSO configuration file. In some embodiments of the present invention, uncommon pinned locations that fall outside of the range set forth by the predetermined threshold distance are then marked as 'pending'. In some embodiments of the present invention, the ICSO configuration is checked to identify a customized priority percentage, which is then assigned as a weight to each pinned locations. Locations having the weights above a predetermined threshold (e.g., locations having high weights) are then included when creating an upcoming route, which will be merged into the common route. This process is repeated until the destination is reached on the map. The system then generates an initial prioritized group trip ICSO and generates an initial trip route based on the prioritized group trip ICSO.

Various suitable machine learning algorithms may be used to dynamically update and/or generate ICSOs. In one example, a Watson API service may be used to implement and/or call one or more machine learning algorithms that extract real-time personal status and environmental factors, translate text using a translating API for universal users, derive insights from social media, enterprise data, and/or from other digital communications, preprocess grouping results before collection, and/or that cognitively searches and analyzes the received data to identify real-time patterns, trends, and/or actionable insights to drive better decision-making. The following are non-limiting examples of cognitive APIs that may be used: Alchemy Language Icon Alchemy Language, Conversation Service Icon Conversation, Dialog Icon Dialog (Deprecated), Document Conversion Icon Document Conversion, Language Translator Icon Language Translator, Natural Language Classifier Icon Natural Language Classifier, Natural Language Understanding Icon Natural Language Understanding, Personality Insights Icon Personality Insights, Retrieve and Rank Icon Retrieve and Rank, Tone Analyzer Icon Tone Analyzer, Visual Recognition Icon Visual Recognition, Discovery Icon Discovery, and Tradeoff Analytics Icon Tradeoff Analytics.

As used herein, the phrase "machine learning" broadly describes a function of an electronic system that learns from data. A machine learning system, engine, or module can include a trainable machine learning algorithm that can be trained, such as in an external cloud environment, to learn functional relationships between inputs and outputs that are currently unknown.

Machine learning is often employed by numerous technologies to determine inferences and/or relationships among digital data. For example, machine learning technologies, signal processing technologies, image processing technologies, data analysis technologies, and/or other technologies employ machine learning models to analyze digital data, process digital data, determine inferences from digital data, and/or determine relationships among digital data. Machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

In some embodiments of the present invention, the system is configured to update the ICSO during the traversal of the generated trip by the group. In some embodiments of the present invention, the ICSO is updated periodically or constantly throughout the trip. For example, in some embodiments of the present invention, the ICSO is updated in 15-minute increments, in which the updating includes changing a timestamp of the ICSO to a time of the 15-minute increment (e.g., YYYY-MM-DD HH:SS). In some embodiments of the present invention, the timing of when the ICSOs are to be updated is set by default or set in an ICSO configuration file by the group. In some embodiments of the present invention, the default time is 15 minutes.

In some embodiments of the present invention, the ICSO is updated based on real-time states. For example, in some embodiments of the present invention, the ICSO is updated based on states that include current weather and/or traffic conditions.

In some embodiments of the present invention, the system is configured to recognize one or more user profiles associated with the current trip, in which the profiles cover aspects that determine a trip experience of the user. In some embodiments of the present invention, the recognizing includes determining whether the user associated with the user profile has previously been to a location proximately located to a current location (e.g., within a predetermined threshold distance). In some embodiments of the present invention, the recognizing includes determining feedback of the user regarding a prior experience at the location. In some embodiments of the present invention, the recognizing includes determining what hotels and restaurants are within a predetermined configured distance of a current location of the user. In which the configured distance is based on the user's customized preferences. In some embodiments of the present invention, the user profile includes travel history, preferences, age, education, personality, emotions, medical conditions and/or trip goals.

In some embodiments of the present invention, the system is configured to provide a graphical user interface to users during the trip such that the users may make changes. For example, in some embodiments of the present invention, a user of the group may select a different scenery, which maps with predefined scenery in HCTG(0—mountain, 1—lake, 2—river, 3—village, 4—waterfall)). In some embodiments of the present invention, the selection is received via a single click.

In some embodiments of the present invention, after the trip has been traversed by a member of the group, the system is configured to record each individual's historical scheme objects (e.g., ICSOs), update the group trip ICSO, and store both in a profiling repository (e.g., database).

The following is an example set of rules that may be applied by the system to keep track of the ICSO of each user. It should be understood that other suitable rules may be applied. For example, in some embodiments of the present invention, the set of rules includes storing each Individual ICSO in the format of a digital record, in which in some embodiments of the present invention are each stored in a cloud environment. Storing the ICSOs on the cloud assists in allowing users to access their ICSOs in digital form from various user devices and review their trip history. In some embodiments of the present invention, the set of rules includes the system imitating alternative trip experiences, which are trip experiences that have not actually occurred in reference to a real trip (e.g., unreal experiences). These "unreal" experiences are ones that were not selected by the system, either because of bad conditions like weather, and/or because of the group's alternative choice of route. In some embodiments of the present invention, because ICSOs are able to keep track of each trip plan attempted, including trip plans for trips that did not occur, the ICSOs may provide an option to create a new experience when revisiting. The tracks ICSOs are collected and stored in a profiling repository for reference (e.g., a HCTG database).

Figure 3:
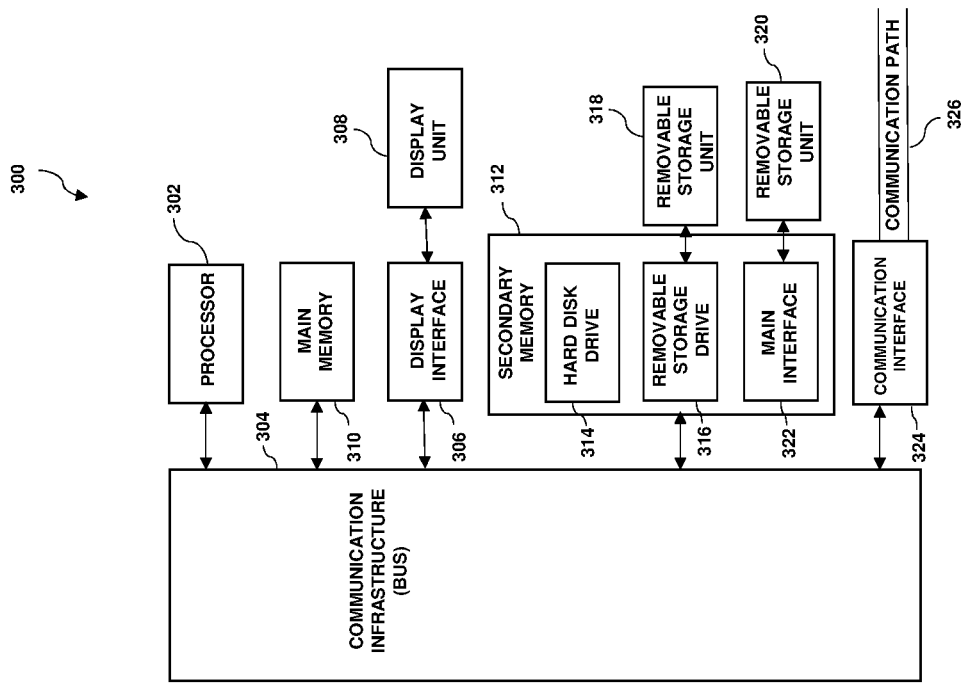
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
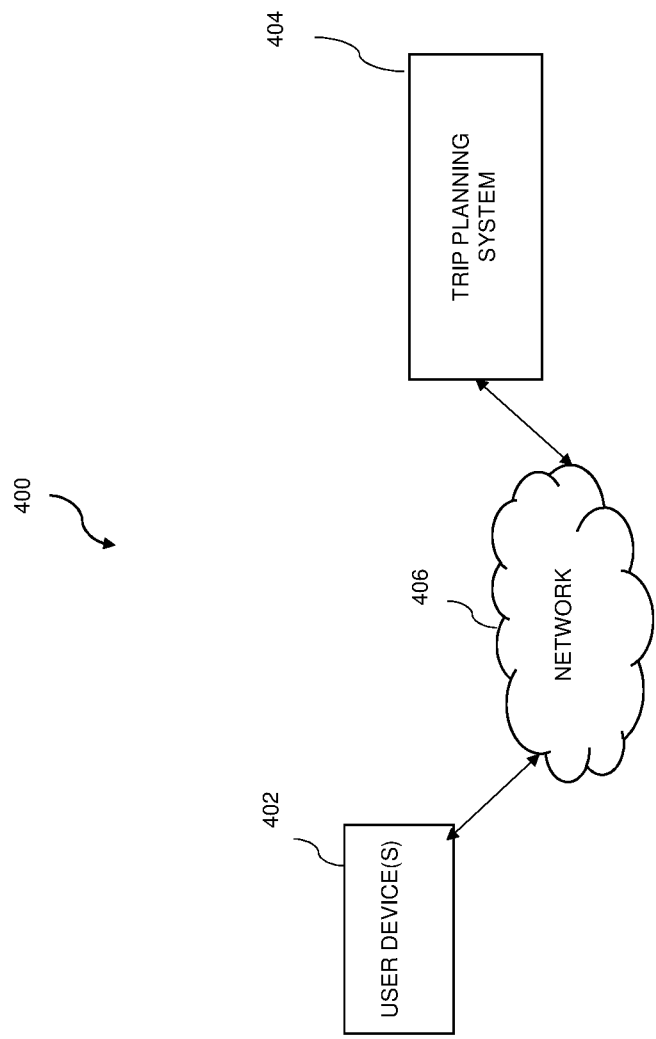
FIG. 4 depicts an exemplary distributed computing environment for building a prioritized group trip object to generate a social trip plan recommendation in accordance with one or more embodiments of the present invention.

Referring now to FIG. 4, an example distributed environment 400 is presented for building a prioritized group trip object to generate a social trip plan recommendation in accordance with one or more embodiments of the present invention. Distributed environment 400 includes one or more user devices 402, and a trip planning system 404, which are interconnected over network 406. FIG. 4 provides an illustration of only one example system and does not imply any limitations with regard to other systems in which different embodiments of the present invention may be implemented. Various suitable modifications to the depicted environment may be made, by those skilled in the art, without departing from the scope of the invention as recited by the claims.

In general, as will be discussed in detail below, in some embodiments of the present invention trip planning system 404 is configured to receive a static trip grouping scheme object for a group of users, generate, an interactive customized scheme object (ICSO) for each user, merge the plurality of ICSOs to generate a prioritized group trip ICSO, and generate a recommended trip plan for the group based, at least in part, on the prioritized group trip ICSO.

In some embodiments of the present invention, trip planning system 404 is a standalone computing device, a management server, a web server, a mobile computing device, or other suitable electronic device and/or computing system capable of receiving, sending, and processing data. In some embodiments of the present invention, memory trip planning system 404 is a server computing system utilizing multiple computers, such as in cloud computing environment 50 (FIG. 1). In some embodiments of the present invention, trip planning system 404 is a laptop computer, a tablet computer, a netbook computer, a personal computer (PC), a desktop computer, a personal digital assistant (PDA), a smartphone, or other suitable programmable electronic device capable of communicating with user device 402 and other computing devices (not shown) within distributed environment 400 via network 406. In some embodiments of the present invention trip planning system 404 is a computing system utilizing clustered computers and components (e.g., database server computers, application server computers, etc.) that act as a single pool of seamless resources that are accessible within distributed environment 400. Trip planning system 404 may have internal and external hardware components, such as those depicted and described above with respect to FIG. 3.

Network 406 can be, for example, a telecommunications network, a local area network (LAN), a wide area network (WAN), such as the Internet, or a combination of the three, and can include wired, wireless, or fiber optic connections. Network 406 can include one or more wired and/or wireless networks that are capable of receiving and transmitting data, voice, and/or video signals, including multimedia signals that include voice, data, and video information. In general, network 406 can be any suitable combination of connections and protocols that can support communications between user device 402, trip planning system 404, and/or other computing devices (not shown) within a distributed environment 400. In some embodiments of the present invention, distributed environment 400 is implemented as part of a cloud computing environment such as cloud computing environment 50 (FIG. 1).

User device 402 is configured to allow users to send and/or receive information from trip planning system 404. In some embodiments of the present invention, user device 402 is configured to allow a user to enter social media data into the user device 402 via an input interface (e.g., microphone, camera, keyboard, touch display, etc.) and then transmit the social media data to trip planning system 404. A user may transmit various forms of social media data via user device 402, such as for example, pictures, audio, video, text-based data such as comments, a list of interests, a music profile that lists songs, albums, genres, or artists of interest to the user, as well as fitness information regarding activities performed by the user, location data pertaining to locations traveled to by the user, a calendar that includes event data of prior or future events (e.g., location of an event, name of an event, participants of the event), medical data, and/or other types or sources of social media data. In some embodiment of the present invention, user device 402 includes one or more sensors for obtaining sensor data of the user. For example, in some embodiments of the present invention, user device 402 includes a GPS device that is configured to obtain location information of the user device, which may be used to determine a movement pattern of the user, historical location information of the user, present location of the user, and/or identify other users that are in a vicinity that is proximate to the user (e.g., by comparing location data obtained by various users). In some embodiments of the present invention, user device 402 is configured to capture audio, images, and/or video of an activity of the user via a microphone and/or the camera of user device 402.

In some embodiments of the present invention, user device 402 is a laptop computer, a tablet computer, a netbook computer, a personal computer (PC), a desktop computer, a personal digital assistant (PDA), a smartphone, or other suitable programmable electronic device capable of communicating with various components and devices within distributed environment 400. In some embodiments of the present invention, user device 402 is a programmable electronic mobile device or a combination of programmable electronic mobile devices capable of executing machine readable program instructions and communicating with other computing devices (not shown) within distributed environment 400. In some embodiments of the present invention, user device 402 may include internal and external hardware components, such as those depicted and described above with respect to FIG. 3.

System 400 is a machine learning system that can be utilized to solve a variety of technical issues (e.g., learning previously unknown functional relationships) in connection with technologies such as, but not limited to, machine learning technologies, video processing technologies, language sorting technologies, data analytics technologies, data classification technologies, data clustering technologies, recommendation system technologies, signal processing technologies, and/or other digital technologies. System 400 employs hardware and/or software to solve problems that are highly technical in nature, that are not abstract and that cannot be performed as a set of mental acts by a human. FIG. 4 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims.

Figure 5:
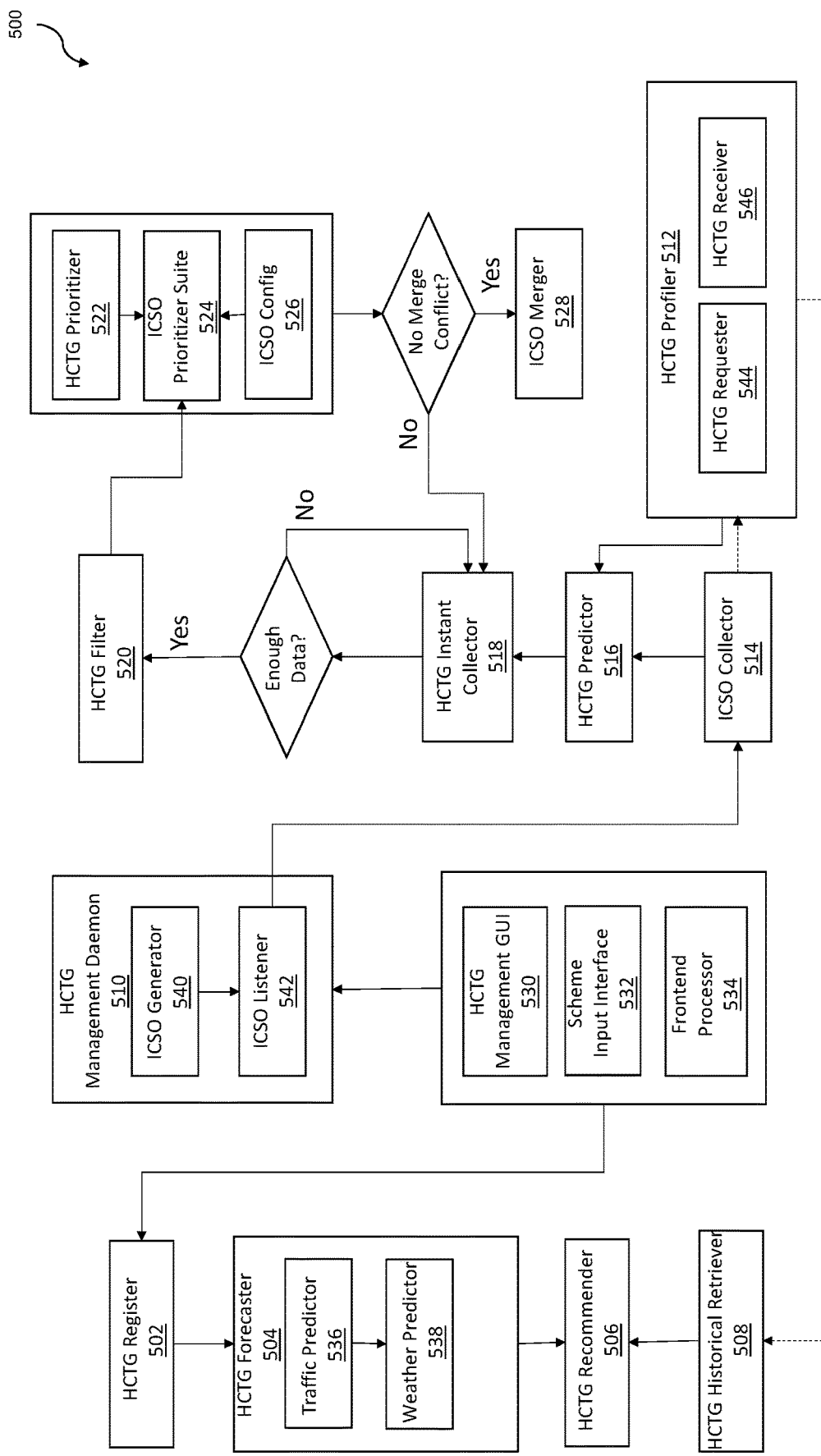
FIG. 5 depicts a block diagram of an exemplary system and corresponding component flow for building a prioritized group trip object to generate a social trip plan recommendation in accordance with one or more embodiments of the present invention.

FIG. 5 depicts a block diagram of an example system 500 and corresponding component flow for building a prioritized group trip object to generate a social trip plan recommendation in accordance with one or more embodiments of the present invention. System 500 includes a HCTG register 502, a HCTG forecaster 504, a HCTG recommender 506, a HCTG historical retriever 508, a HCTG management daemon 510, a HCTG profiler 512, a ICSO collector 514, a HCTG predictor 516, a HCTG instant collector 518, a HCTG filter 520, a HCTG prioritizer 522, an ICSO prioritizer suite 524, an ICSO config 526, an ICSO manager 528, a HCTG management GUI 530, a scheme input interface 532, and/or a frontend processor 534, which may, in some embodiments of the present invention, be interconnected via a communication infrastructure 304 and/or communication path 326. In some embodiments of the present invention, HCTG forecaster 504 includes a traffic predictor 536 and/or a weather predictor 538. In some embodiments of the present invention, HCTG management daemon 510 includes an ICSO generator 540 and/or an ICSO listener 542. In some embodiments of the present invention, HCTG profiler 512 includes an HCTG requester 544 and/or a HCTG receiver 546.

HCTG register 502 includes an application, module, or system that is configured to receive a static grouping trip input as variables and initiate an HCTG flow. In some embodiments of the present invention, each person in the trip group registers separately via HCTG register 502. In some embodiments of the present invention, HCTG register 502 is configured to recognize and define trip types and potential scenery values (e.g., mountain, 1—lake, 2—river, 3—village, 4—waterfall).

HCTG forecaster 504 includes an application, module, or system that acts as a control unit that is configured to connect related forecast modules based on user input and to collect forecast data for traffic predictor 536 and/or weather predictor 538. Traffic predictor 536 is configured to predict traffic conditions within an inputted data range and to generate multiple potential routes based on the traffic conditions. Weather predictor 538 is configured to predict weather conditions within an inputted data range and to generate multiple potential routes based on the weather conditions.

HCTG recommender 506 includes an application, module, or system that is configured to create an initial recommended group trip plan, in which the initial plan is based on individual inputs and prediction. In some embodiments of the present invention, HCTG recommender 506 is configured to provide recommended plans via a GUI module, in which the recommended plans are provided as customizable results. In some embodiments of the present invention, an individual may make further selections according to the HCTG recommender 506 and then cause their own designated plan to be generated.

HCTG historical retriever 508 includes an application, module, or system that is configured to recognize each individual based on input provided by the individual and to extract a trip history of the individual based on the input. In some embodiments of the present invention, HCTG historical retriever 508 is configured to recognize an individual's preferences and to assist in creating a new trip experience based on historical data (e.g., via machine learning).

HCTG management daemon 510 includes an application, module, or system that is configured to create and monitor ICSOs. In some embodiments of the present invention, upon detecting that an ICSO does not presently exist for each individual in the group, HCTG management daemon 510 is configured to request that ICSO generator module 540 generate an ICSO for each missing individual. In some embodiments of the present invention, upon HCTG management daemon 510 detecting that an ICSO exists for a particular user, HCTG management daemon 510 is configured to update the ICSO based on a newly obtained registration. ICSO generator 540 is configured to create individual ICSOs in a group based, at least in part, on received user input, state forecasting, and individual preferences. ICSO listener 542 acts as an intermediary module between ICSO generator 540 and ICSO collector 514, in which ICSO listener 542 is configured to monitor newly created ICSOs and ensure ICSO for each individual is successfully created (e.g., created without errors, or a limited number of errors). Upon detecting that the new ICSO are successfully created, ICSO listener 542 is configured to provide complete scheme objects for the group to ICSO collector 514.

HCTG profiler 512 includes a cognitive application, module, or system for user profiling, in which each individual in the group is associated with a respective profile repository. HCTG profiler 512 is configured to collect information from other devices with consent by the individual, such as for example, collecting a user's age, gender, education, hobbies, trip history, medical history, and/or other information pertaining to the user (e.g., social media data). In some embodiments of the present invention, HCTG profiler 512 includes HCTG requester 544, which is an enhancement unit that detects collected user data and analyzes the data for sufficiency. In some embodiments of the present invention, users pre-configure HCTG requester 544 to select certain information to be considered for trip planning (e.g., education, medical history, etc.). This pre-configuration assists in protecting an individual's privacy while maximizing the satisfaction of a customizable trip experience. In some embodiments of the present invention, HCTG profiler 512 includes HCTG receiver 546, which is a listening unit that is configured to collect user data and generate HCTG profiling information for storage in the corresponding profile repository.

ICSO collector 514 includes an application, module, or system that is configured to collect previous and current scheme objects. In some embodiments of the present invention, as ICSO collector 514 may be connected to trip profiling repository and a user profile repository and user repository, scheme objects may be updated simultaneously to achieve cognitive self-learning (e.g., executing one or more machine learning processes, algorithms, and/or models).

HCTG predictor 516 includes an application, module, or system that is configured to generate enhanced ICSOs based on profiling information and original ICSOs as input. HCTG predictor 516 is configured to generate scheme objects based on individual preference.

HCTG instant collector 518 includes an application, module, or system that is configured to collect real-time information based on user profiling and enhanced ICSOs, in which the information includes weather, traffic conditions, medical emergency options, gas stations, and/or other items following a certain time during the trip (e.g., hour during the trip). In some embodiments of the present invention, HCTG instant collector 518 is configured to provide on-the-go data that is able to react to changes and generate an updated trip plan based on the changes.

HCTG filter 520 includes an application, module, or system that is configured to filter out certain ICSO scheme plans based on a set of predetermined filtering conditions. For example, in some embodiments of the present invention, HCTG filter 520 is configured to filter out scheme plans in accordance where weather conditions are not optimal (e.g., expected rain) and/or where a gas tank refill may be required (e.g., distance too far). HCTG filter 520 is configured to analyze such situations and archive scheme plans that require filtering according to the predetermined filtering conditions.

HCTG prioritizer 522 includes an application, module, or system that is configured to perform top-level trip optimizing based on averaging a maximum (e.g., high) trip experience for each individual. HCTG prioritizer 522 reduces an individual's trip scheme objects and balances a result of the ICSOs.

ICSO prioritizer suite 524 includes an application, module, or system that is configured to perform a second level prioritizing within each individual's ICSO. As an individual's ICSO may change during a trip, ICSO prioritizer suite 524 is configured to generate multiple ICSOs for each individual. Prior ICSOs may remain valid as the ICSOs reflect a user's choice over time. ICSO prioritizer suite 524 is configured to track schemes where conditions are not optimal and then make automatic prioritizing changes upon detecting that conditions have improved (i.e., improved weather conditions).

ICSO config 526 is a customizable configuration file that is configured to override, supplement, and/or intervene prioritization of ICSO prioritizer suite 524 such that one or more predetermined individual's ICSO are granted higher priority as compared to other ICSOs when merging. For example, in some embodiments of the present invention, in the context of a birthday trip with friends, ICSO config 526 may cause ICSO prioritizer suite 524 to prioritize preferences of the induvial whose birthday the trip is planned around.

ICSO manager 528 includes an application, module, or system that is configured to merge prioritizing ICSOs from each individual in the group trip based one or more merge rules. For example, in some embodiments of the present invention, the one or more merge rules includes keeping common features among the schemes while balancing features that are different among the schemes.

HCTG management GUI 530 includes an application, module, or system that is configured to provide a user input interface for a user and provide a graphic grouping trip strategy (e.g., via display device of user device 402 of FIG. 4). In some embodiments of the present invention, scheme interface input 532 includes the user input interface for receiving user inputs for scheme customization. In some embodiments of the present invention, frontend processor 534 is configured to output a graphic result for dynamic grouping trip strategy (e.g., output a proposed trip map route).

Figure 6:
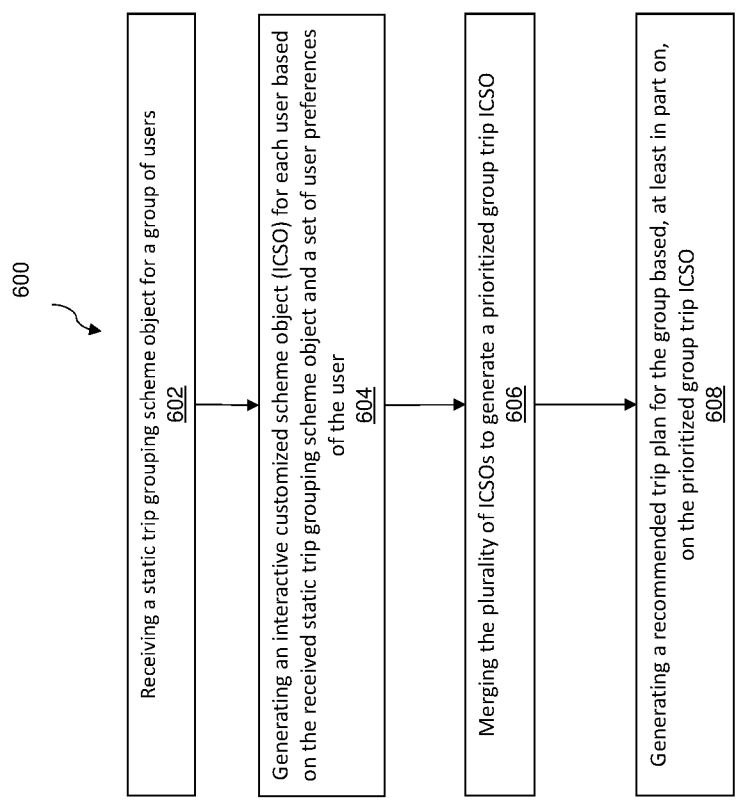
FIG. 6 depicts a flow diagram illustrating a methodology in accordance with one or more embodiments of the present invention.

Additional details of the operation of systems 400 and systems 500 will now be described with reference to FIG. 6, wherein FIG. 6 depicts a flow diagram illustrating a methodology 600 according to one or more embodiments of the present invention. At block 602, a static trip grouping scheme object is received for a group of users. In some embodiments the group including two or more users. At block 604 an ICSO is generated for each user based, at least in part, on the received static trip grouping scheme object and on a set of user preferences of the user such that a plurality of ICSOs are generated for the group of users. In some embodiments of the present invention, at least one ICSO of the plurality of ICSOs includes an intermediate sightseeing destination list, a restaurants list, a hotels list, and/or a preferred scenery list. At block 606, the plurality of ICSOs are merged to generate a prioritized group trip ICSO, in which the merging is based on a first set of prioritization rules and on a second set of prioritization rules. In some embodiments of the present invention, the first set of prioritization rules are a set of shared options, in which the set of shared options includes merging based on a common trip route found in the plurality of ICSOs. At block 608 a recommended trip plan is generated for the group of users, in which the plan is generated based, at least in part, on the prioritized group trip ICSO.

In some embodiments of the present invention, the second set of prioritization rules are non-shared option merging rules. In some embodiments of the present invention, the non-shared option merging rules includes at least one of an equality mode or a priority mode. In some embodiments of the present invention, the equality mode includes each individual having a same priority. In some embodiments of the present invention, the priority mode includes setting a different level of priority for at least one individual in the group as compared to other individuals in the group.

In some embodiments of the present invention, the static trip grouping input includes an origin address, a destination address, a start date, an end date, and/or a list of people, in which the list of people including the plurality of users.

In some embodiments of the present invention, the set of user preferences of the user are extracted, based at least in part, on a social media account associated with the user.

In some embodiments of the present invention, methodology 600 further includes updating the prioritized group trip ICSO based on real-time weather conditions and on traffic conditions.

In some embodiments of the present invention, the extracting of the set of user preferences of the user includes presenting a graphical user interface to the user, in which the presentation includes a plurality of trip plan options, receiving from the user a selection of at least one trip plan option of the plurality of trip plan options, and identifying the set of user preferences based, at least in part, on the received selection.

In some embodiments of the present invention, methodology 600 further includes executing one or more machine learning algorithms to update the prioritized group trip ICSO, in which the updating is based, at least in part, on one or more further selections of at least one trip plan option of the plurality of trip plan options by at least one user of the group of users. In some embodiments of the present invention, the one or more further selections are received via the presentation of the plurality of trip plan options.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for building a prioritized group trip object to generate a social trip plan recommendation, the method comprising:

receiving, by a system comprising one or more processors, a static trip grouping scheme object for a group of users, the group including two or more users;
    generating, by the system, an interactive customized scheme object (ICSO) for each user based, at least in part, on the received static trip grouping scheme object and on a set of user preferences of the user such that a plurality of ICSOs are generated for the group of users, wherein at least one ICSO of the plurality of ICSOs includes a preferred scenery list;
    merging, by the system, the plurality of ICSOs to generate a prioritized group trip ICSO, wherein the merging is based, at least in part, on a first set of prioritization rules and a second set of prioritization rules, wherein the first set of prioritization rules includes merging based on a common trip route found in the plurality of ICSOs; and
    generating, by the system, a recommended trip plan for the group based, at least in part, on the prioritized group trip ICSO,
    wherein the second set of prioritization rules includes non-shared option merging rules, wherein the non-shared option merging rules includes at least one of an equality mode and a priority mode, wherein the equality mode includes each individual having a same priority, wherein the priority mode includes setting a different level of priority for at least one individual in the group as compared to other individuals in the group.

2. The computer-implemented method of claim 1, wherein the static trip grouping input includes an origin address, a destination address, a start date, an end date, and a list of people, the list of people including the plurality of users.

3. The computer-implemented method of claim 1, wherein the set of user preferences of the user are extracted, based at least in part, on a social media account associated with the user.

4. The computer-implemented method of claim 1 further comprising:
    updating the prioritized group trip ICSO based on real-time weather conditions and on traffic conditions.

5. The computer-implemented method of claim 1, wherein the extracting of the set of user preferences of the user includes:
    presenting a graphical user interface to the user, the presentation includes a plurality of trip plan options;
    receiving from the user a selection of at least one trip plan option of the plurality of trip plan options; and
    identifying the set of user preferences based, at least in part, on the received selection.

6. The computer-implemented method of claim 5 further comprising:
    executing one or more machine learning processes to update the prioritized group trip ICSO based, at least in part, on one or more further selections of at least one trip plan option of the plurality of trip plan options by at least one user of the group of users, wherein the one or more further selections are received via the presentation of the plurality of trip plan options.

7. A computer program product for building a prioritized group trip object to generate a social trip plan recommendation, the computer program product comprising a computer readable storage medium having program instructions embodied therewith, wherein the computer readable storage medium is not a transitory signal per se, the program instructions executable by a system comprising one or more processors to cause the system to perform a method comprising:

receiving, by the system, a static trip grouping scheme object for a group of users, the group including two or more users;

generating, by the system, an interactive customized scheme object (ICSO) for each user based, at least in part, on the received static trip grouping scheme object and on a set of user preferences of the user such that a plurality of ICSOs are generated for the group of users, wherein at least one ICSO of the plurality of ICSOs includes at a preferred scenery list;

merging, by the system, the plurality of ICSOs to generate a prioritized group trip ICSO, wherein the merging is based, at least in part, on a first set of prioritization rules and a second set of prioritization rules, wherein the first set of prioritization rules includes merging based on a common trip route found in the plurality of ICSOs; and generating, by the system, a recommended trip plan for the group based, at least in part, on the prioritized group trip ICSO, wherein the second set of prioritization rules includes non-shared option merging rules, wherein the non-shared option merging rules includes at least one of an equality mode and a priority mode, wherein the equality mode includes each individual having a same priority, wherein the priority mode includes setting a different level of priority for at least one individual in the group as compared to other individuals in the group.

8. The computer program product of claim 7, wherein the static trip grouping input includes an origin address, a destination address, a start date, an end date, and a list of people, the list of people including the plurality of users.

9. The computer program product of claim 7, wherein the set of user preferences of the user are extracted, based at least in part, on a social media account associated with the user.

10. The computer program product of claim 7, wherein the method further includes:
updating the prioritized group trip ICSO based on real-time weather conditions and on traffic conditions.

11. The computer program product of claim 7, wherein the extracting of the set of user preferences of the user includes:
presenting a graphical user interface to the user, the presentation includes a plurality of trip plan options;
receiving from the user a selection of at least one trip plan option of the plurality of trip plan options; and
identifying the set of user preferences based, at least in part, on the received selection.

12. The computer program product of claim 11, wherein the method further includes:
executing one or more machine learning processes to update the prioritized group trip ICSO based, at least in part, on one or more further selections of at least one trip plan option of the plurality of trip plan options by at least one user of the group of users, wherein the one or more further selections are received via the presentation of the plurality of trip plan options.

13. A system for building a prioritized group trip object to generate a social trip plan recommendation, the system comprising one or more processors configured to perform a method comprising:
receiving, by the system, a static trip grouping scheme object for a group of users, the group including two or more users;

generating, by the system, an interactive customized scheme object (ICSO) for each user based, at least in part, on the received static trip grouping scheme object and on a set of user preferences of the user such that a plurality of ICSOs are generated for the group of users, wherein at least one ICSO of the plurality of ICSOs includes a preferred scenery list;

merging, by the system, the plurality of ICSOs to generate a prioritized group trip ICSO, wherein the merging is based, at least in part, on a set of shared options and a second set of prioritization rules, wherein the first set of prioritization rules includes merging based on a common trip route found in the plurality of ICSOs; and generating, by the system, a recommended trip plan for the group based, at least in part, on the prioritized group trip ICSO, wherein the second set of prioritization rules includes non-shared option merging rules, wherein the non-shared option merging rules includes at least one of an equality mode and a priority mode, wherein the equality mode includes each individual having a same priority, wherein the priority mode includes setting a different level of priority for at least one individual in the group as compared to other individuals in the group.

14. The system of claim 13, wherein the static trip grouping input includes an origin address, a destination address, a start date, an end date, and a list of people, the list of people including the plurality of users, wherein the set of user preferences of the user are extracted, based at least in part, on a social media account associated with the user.

15. The system of claim 13, wherein the method further includes:
updating the prioritized group trip ICSO based on real-time weather conditions and on traffic conditions.

16. The system of claim 13, wherein the extracting of the set of user preferences of the user includes:
presenting a graphical user interface to the user, the presentation includes a plurality of trip plan options;
receiving from the user a selection of at least one trip plan option of the plurality of trip plan options; and
identifying the set of user preferences based, at least in part, on the received selection.

17. The system of claim 16, wherein the method further includes:
executing one or more machine learning processes to update the prioritized group trip ICSO based, at least in part, one or more further selections of at least one trip plan option of the plurality of trip plan options by at least one user of the group of users, wherein the one or more further selections are received via the presentation of the plurality of trip plan options.

* * * * *